United States Patent [19]

Friedmann

[11] Patent Number: 4,865,861
[45] Date of Patent: Sep. 12, 1989

[54] PROCESSING OF BIOLOGICAL PRODUCTS

[75] Inventor: Eric H. Friedmann, Constantia, South Africa

[73] Assignee: Norzon Management Limited, Guernsey, Channel Islands

[21] Appl. No.: 225,867

[22] Filed: Jul. 29, 1988

Related U.S. Application Data

[62] Division of Ser. No. 102,677, Sep. 30, 1987.

[30] Foreign Application Priority Data

Sep. 30, 1986 [ZA] South Africa ............... 86/7435

[51] Int. Cl.$^4$ ............................................. A23P 1/00
[52] U.S. Cl. ..................................... 426/486; 426/519
[58] Field of Search ............... 426/486, 487, 488, 489, 426/519; 99/467, 470, 472, 483, 473, 484, 485, 516, 534; 141/59, 65; 34/92

[56] References Cited

U.S. PATENT DOCUMENTS 4,014,153  3/1977  Wilson ........................... 426/486
4,379,796  4/1983  Gross ............................. 426/486

Primary Examiner—George Yeung
Attorney, Agent, or Firm—Larson and Taylor

[57] ABSTRACT

A method for processing biological raw edible material into a creamy-like substance. The method includes the steps of supplying raw edible material into a collector and then displacing the raw edible material from the collector to a de-aeration container. At the de-aeration container air is eliminated from the raw edible material. Thereafter excess raw edible material is allowed to pass back from the de-aeration container into the collector. The remainder of the raw edible material is supplied from the de-aeration container to a high pressure device for homogenizing the raw edible material thereat.

4 Claims, 1 Drawing Sheet

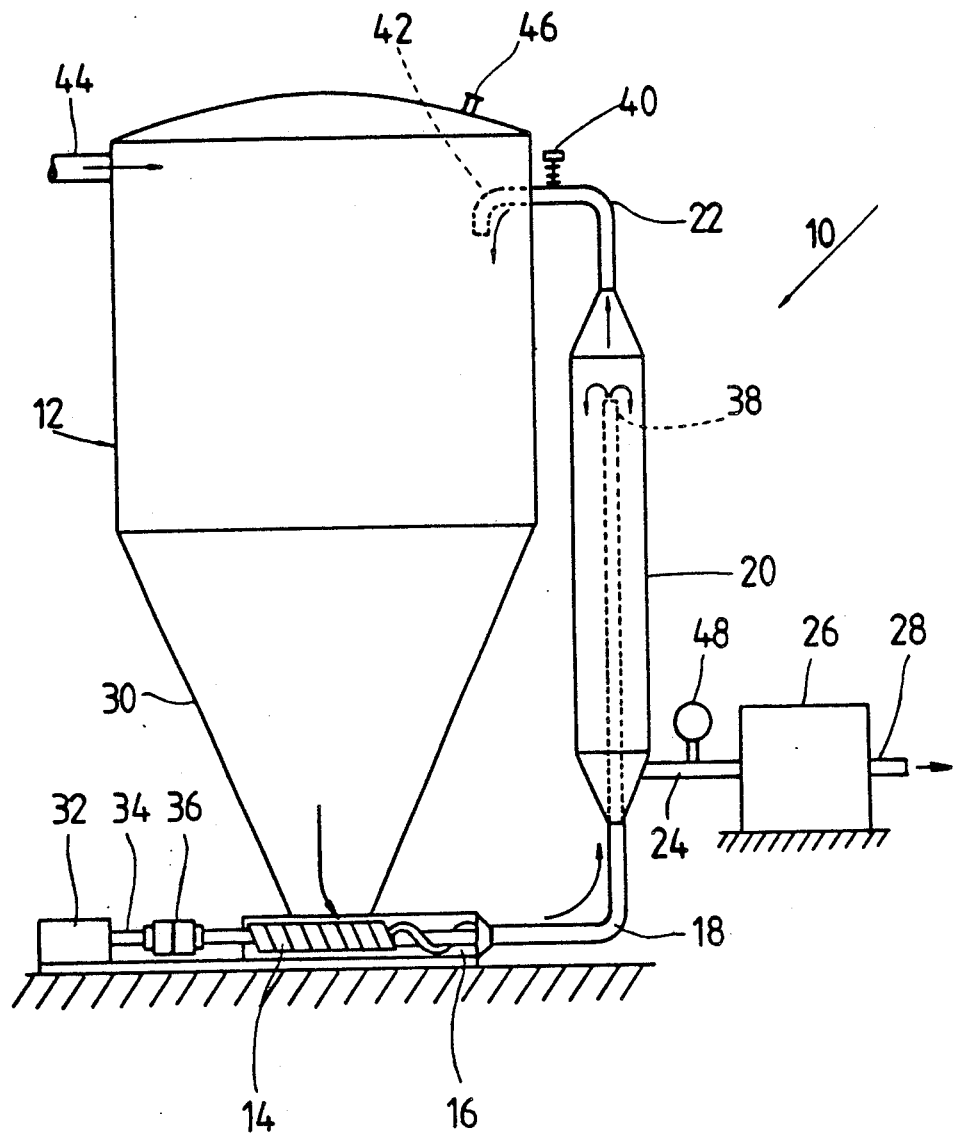

PROCESSING OF BIOLOGICAL PRODUCTS

This is a division of application Ser. No. 102,677, filed Sept. 30, 1987.

SUMMARY

An arrangement for processing biological raw material into a creamy-like substance, which includes a collector container with a material supply means and a high pressure unit with an outlet conduit for processed material. The arrangement further includes a de-aeration container; a discharge conduit for supplying raw material from the collector container to the de-aeration container; a feeding conduit for feeding de-aerated raw material to the high pressure unit; a return conduit for guiding excess raw material in the de-aeration container back to the collector container; and de-aeration means for de-aerating raw material in the de-aeration container. Displacing means is provided to displace raw material to the various parts. Furthermore a method of processing raw material is provided. It includes the steps of supplying raw material into a collector and, after de-aeration, to a high pressure stage whilst allowing excess raw material to pass from the de-aeration stage back into the collector.

FIELD OF INVENTION

The present invention relates to the processing of biological products.

More particularly, the invention relates to the processing of biological products, such as fruit and/or vegetables.

BACKGROUND TO INVENTION

Biological products may include plant products, such as fruit or vegetables.

Various methods are known to process biological products, such as fruit or vegetables, into a flowable end product.

In such known methods the raw material generally is treated by adding chemicals, water or any other desired additives (such as preservatives) and thereafter is rendered into flowable form by pressure application. The aim in many instances is to have a final product, which is a creamy-like substance.

However, in practice the conventional methods for rendering such biological products into a creamy-like substance often are not successful and do not always result in a satisfactory end product.

It is an object of the invention to suggest an improved method and arrangement for processing biological products, such as fruit and/or vegetables.

In the specification and claims hereinafter the expression "raw material" is intended to include any suitable biological product, such as fruit and/or vegetables.

SUMMARY OF INVENTION

According to the invention, a method of processing raw edible material includes the steps of
(a) supplying raw edible material into a collector;
(b) displacing raw edible material from the collector to a de-aeration container;
(c) eliminating air from the raw material in the de-aeration container;
(d) allowing excess raw edible material to pass back from the de-aeration container into the collector; and
(e) supplying de-aerated raw edible material from the de-aeration container to a high pressure device for homogenizing the raw edible material thereat.

The de-aerated raw edible material may be homogenized in the high pressure device.

The rate of displacement from the collector to the de-aeration container may be a multiple of the rate of displacement through the high pressure device so that continuous circulation of excess raw edible material from the de-aeration container to the collector takes place.

BRIEF DESCRIPTION OF DRAWING

The invention will now be described by way of example with reference to the accompanying schematic drawing.

In the drawing there is shown a schematic layout of a processing arrangement in accordance with the invention.

DETAILED DESCRIPTION OF DRAWING

Referring to the drawing, a processing arrangement in accordance with the invention for processing biological products, such as fruit and/or vegetables, is generally indicated by reference numeral 10. The arrangement includes a collector tank 12, an auger feed unit 14 at the bottom of the tank 12, a positive displacement pump 16 following thereon, a discharge pipe 18 leading upwardly into a de-aerator container 20, a return pipe 22 leading back to the tank 12, a feeding pipe 24 leading to a high pressure pump 26 and a final product pipe 28.

The tank 12 has a funnel shaped bottom part 30 with inclined walls leading to the inlet of the auger feed unit 14. The inclination of the walls of the part 30 must be such to allow free downward flow depending on the viscosity of the raw material to be contained therein. Generally a wall sloping at about 60° to the horizontal is suitable.

The auger feed unit 14 and the positive displacement pump 16 are driven off an electrical motor 32 connected thereto by means of a shaft 34 with coupling 36.

The pipe 18 rises into the container 20 so that its outlet 38 is at a level about two thirds of the height of the container 20.

In the pipe 22 a back pressure control valve 40 is provided. This control 40 is adjustable in normal manner.

The outlet 42 of the pipe 22 opens into the tank 12.

A raw material supply pipe 44 leads into the tank 12. The tank further has an air release valve 46, or the tank 12 may be open at its top.

A pressure meter 48 is provided in the pipe 24.

Raw material, such as fruit and/or vegetable material, is supplied by means of the pipe 44 into the tank 12. The raw material in the tank 12 moves down under the force of gravity to the inlet of the auger feed unit 14. In operation the auger feed unit 14 forces the raw material to the positive displacement pump 16 by means of which the material is pumped along the pipe 18 to emerge at the outlet 38.

Air escapes upwardly and is taken along the pipe 22.

The de-aerated raw material falls down into the container 20 and at the closed bottom is forced to the high pressure pump 26 along the pipe 24, which opens into the bottom part of the container 20.

Excess raw material and air is passed along the pipe 22 to return to the tank 12.

The pumping rate of the pump 16 is a multiple of the pumping rate of the high pressure pump 26. In one practical example, the rate would be 4:1. Accordingly there is a continuous circulation of raw material back into the tank 12 through the pipe 22, and there is no danger of starvation of the supply of the de-aerated raw material to the high pressure pump 26.

Air withdrawn from the container 20 is allowed to escape from the tank 12 by means of the valve 46. This means that the raw material pumped along the pipe 24 to the high pressure pump 26 is de-aerated fully or is substantially free of air.

In the high pressure pump 26, which may be a homogenizer unit, the de-aerated raw material is subjected to a very high pressure and then is discharged as a processed creamy-like product through the outlet pipe 28. This end product can be used for various purposes depending on the type of raw material being processed. For example, in the case of maize it can be used as a base product to which flavour (e.g. fruit juices) are added for receiving a tasteful edible product or juice.

Due to the high pressure applied to the de-aerated raw material in the high pressure pump 26 (e.g. homogenizer), the material is caused to be diminuted into its smallest possible form. Due to this diminution under high pressure potential energy is created in the compressed cells of the de-aerated raw material. When the processed raw material moves out of the high pressure pump into a region of low pressure (e.g. atmospheric pressure), the elastic limit of the cell walls are exceeded due to the internal potential energy and this causes the cell walls to burst thereby releasing the cell contents. Thus the nutrient value of the raw material is made available to its fullest extent.

Due to the high pressure under which the pump 26 operates, it is of importance that fully de-aerated or substantially no air is supplied to it together with the raw material to be processed. For this reason a continuous withdrawal of air out of the container 20 and circulation of the raw material along the pipe 22 back to the tank 12 is essential.

In one example it has been found useful to provide a pressure of from 4 to 8 bars by means of the pump 16 in the pipe 18, the container 20 and the pipe 22, and a pressure of about 200 bars (and higher) by means of the high pressure pump 26. Obviously the particular pressures will depend on the type of product to be processed.

In processing plant raw material, it has been found that the high pressure pump 26 should operate for various products at approximately the following pressures:

| | |
|---|---|
| 1. Reconstituted Maize: | 600–900 bar |
| 2. Fresh Strawberries: | 400–600 bar |
| 3. Fresh Cauliflower: | 130–350 bar |

Where the raw material is in a fresh state having a sufficient moisture content, the raw material generally is pre-cleaned and cut into suitable size (e.g. cube size of 2 mm). The raw material must be in a state so as to be able to be pumpable or otherwise displaceable. It then is fed via the inlet pipe 44 (or otherwise directly through the open top) into the container 12.

However, where the raw material is in a dry form, it is essential to grind or diminute the raw material first, then to reconstitute the raw material by the addition of water (either immersion or boiling in liquid) so that the moisture content of the raw material is increased approximately to a level equivalent to that existing in its fresh natural state. Thereafter the raw material is fed into the tank 12 for processing.

I claim:

1. A method of processing raw edible material, which includes the steps of:
    (a) supplying raw edible material into a collector;
    (b) displacing raw edible material from the collector to a de-aeration container;
    (c) eliminating air from the raw material in the de-aeration container;
    (d) allowing excess raw edible material to pass back from the de-aeration container into the collector; and
    (e) supplying de-aerated raw edible material from de-aerated container to a high pressure device for homogenizing the raw edible material thereat.

2. A method as claimed in claim 1, in which the raw edible material is pumped from the collector to the de-aeration container.

3. A method as claimed in claim 1, in which the de-aerated raw edible material is homogenized in the high pressure device.

4. A method as claimed in claim 1, in which the rate of displacement from the collector to the de-aeration container is a multiple of the rate of displacement through the pressure device so that continuous circulation of excess raw edible material from the de-aeration container to the collector takes place.

* * * * *